April 8, 1941.                    E. S. SMITH                    2,237,582
                     APPARATUS FOR MARKING RUBBER ARTICLES
                          Filed Aug. 9, 1939              2 Sheets-Sheet 1
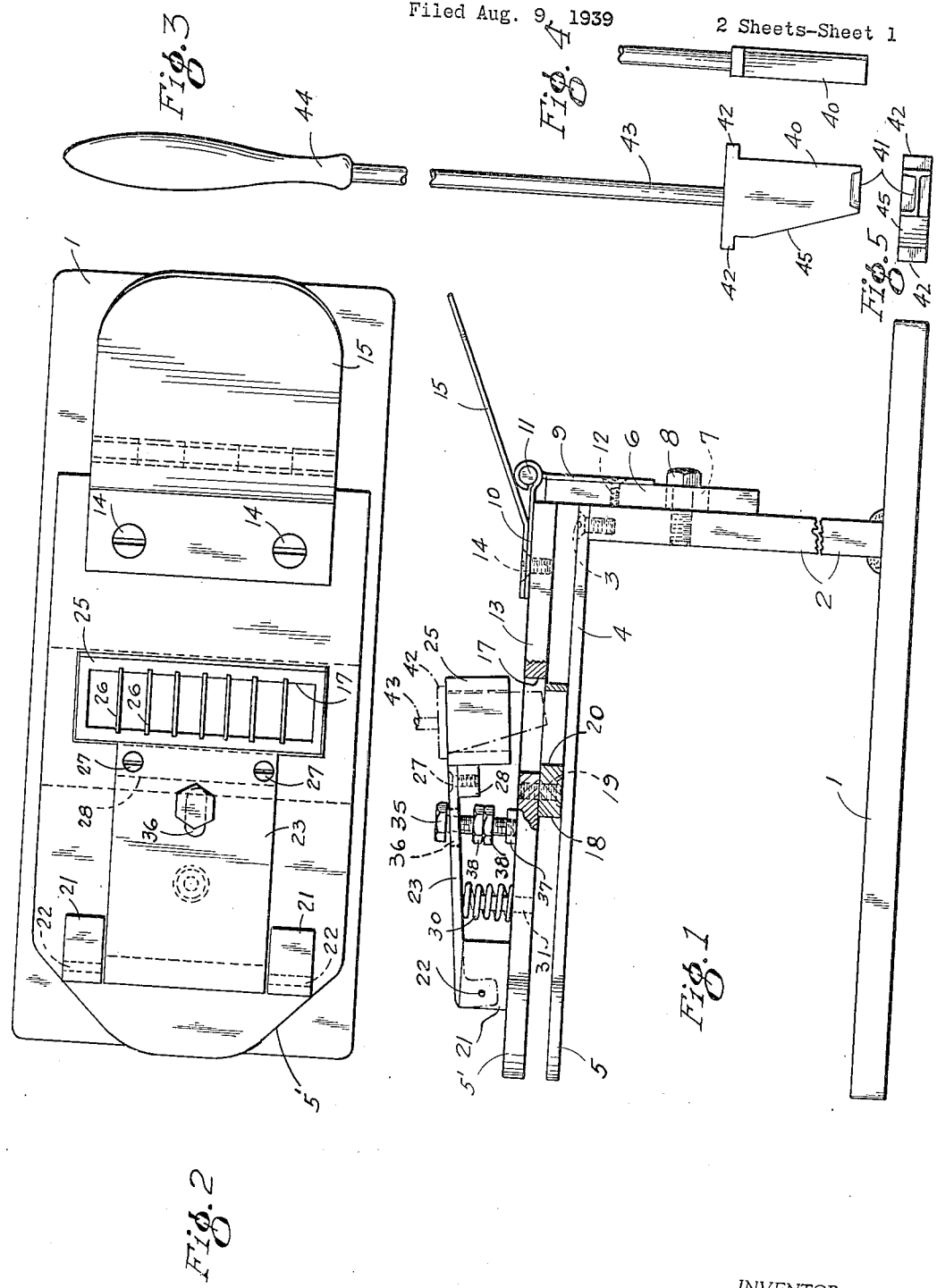
INVENTOR.
EMERSON STERLING SMITH
BY
                ATTORNEYS April 8, 1941.  E. S. SMITH  2,237,582
APPARATUS FOR MARKING RUBBER ARTICLES
Filed Aug. 9, 1939  2 Sheets-Sheet 2
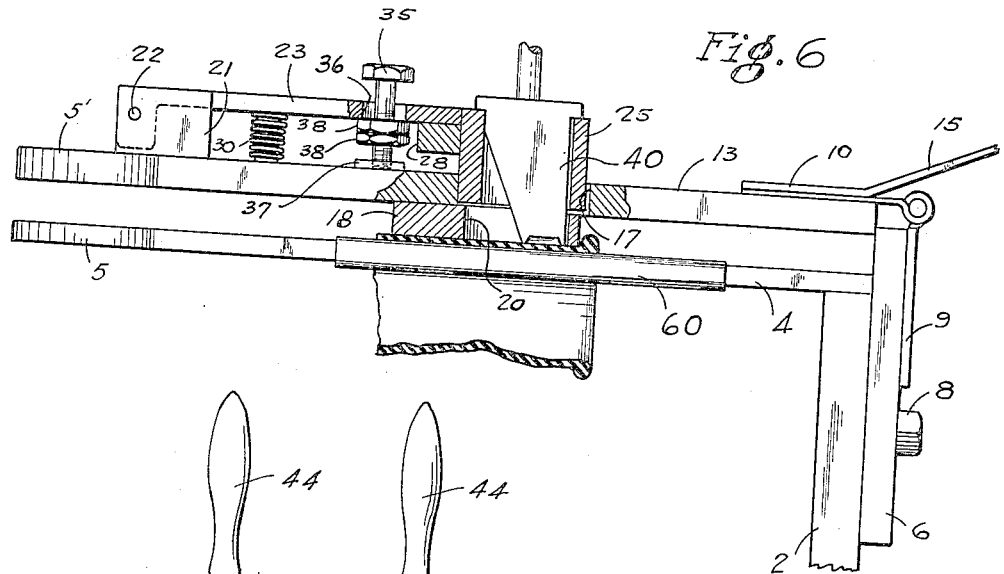
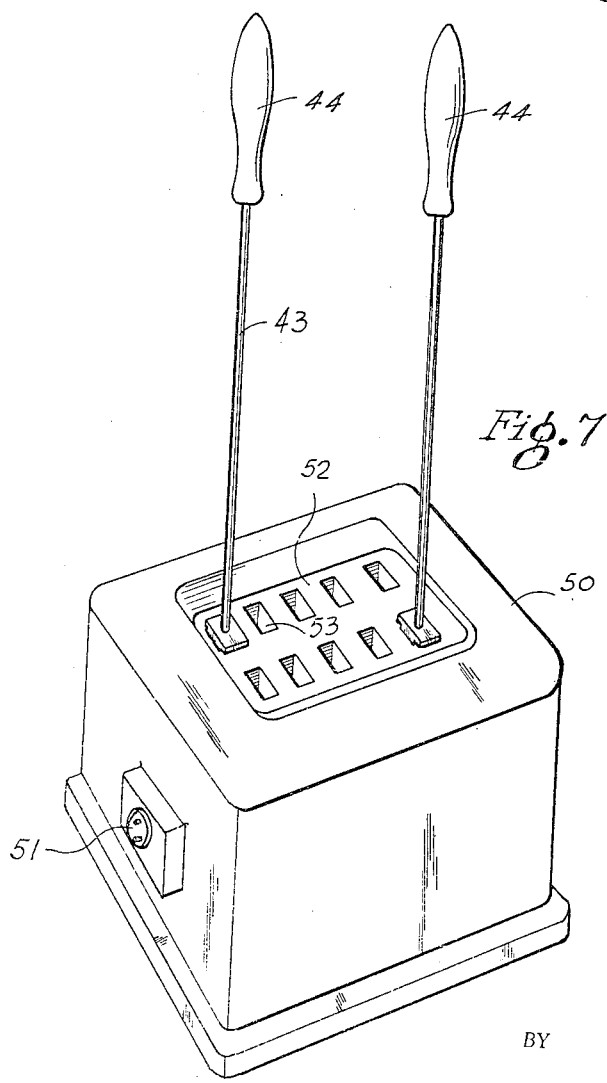
INVENTOR.
EMERSON STERLING SMITH
ATTORNEYS Patented Apr. 8, 1941

2,237,582

UNITED STATES PATENT OFFICE 2,237,582

APPARATUS FOR MARKING RUBBER ARTICLES

Emerson Sterling Smith, Ravenna, Ohio

Application August 9, 1939, Serial No. 289,226

6 Claims. (Cl. 101—10)

This invention relates to improvements in method and apparatus for marking rubber articles, and more particularly to improved branding apparatus for marking of rubber articles such as gloves or the like.

In the manufacture of a great many rubber articles such as rubber gloves, inner tubes, water bags, and the like, it is desirable to mark the same with some indicia such as a serial number. Such marking may serve several purposes; that is the number may indicate the date of manufacture, or it may be useful in larger organizations in determining to whom and upon what date the devices were issued. For instance, rubber gloves such as are used by linemen engaged in working on lines carrying high voltages must undergo rigid periodical inspections. Each glove is assigned a serial number and a historical record kept of the glove to determine when it was purchased, how long it has been in use, and the dates of the periodical electrical testing thereof.

Sometimes these gloves are marked by molding a number into the glove during the fabrication thereof. This marking may not be in accord with the user's desired system and it is therefore the usual practice to mark the gloves in the manner indicated by the purchaser. Inasmuch as the previous method of marking entailed marking during vulcanization, it is obvious that it was not convenient to mark the same in that manner for customers who had their own particular series of numbers or marking. Therefore, the manufacturer makes the gloves up without any particular marking and the marks desired by the purchaser are put on the gloves at the time they are sold. Sometimes the purchaser marks the gloves himself. Previous methods of marking had several disadvantages, in that being rubber, if the marks were branded into the gloves, it was not unusual for the branding to affect the quality of the glove at the point of marking, and either render it unfit for use or subject to a considerable shorter life. By the present invention, and the method of carrying out the same, the gloves can be marked by any series of numbers or indicia quickly and easily without the necessity of employing skilled labor and with an assurance that the glove will not be mutilated because of branding too deeply. The device also assures a nice alignment and more perfect legibility of the marking.

In the drawings, I have illustrated an embodiment of the invention wherein:

Fig. 1 is an elevational view of the apparatus used in my invention with certain parts being broken away and shown in section; a branding iron is shown in position in dotted lines;

Fig. 2 is a plan view of the device of Fig. 1;

Fig. 3 is a side elevational view of a branding iron, the handle being broken;

Fig. 4 is an end elevational view of the branding iron without the handle;

Fig. 5 is an end view of the iron showing the indicia;

Fig. 6 is an enlarged fragmentary view similar to Fig. 1, but showing a fragment of glove in position and with the branding iron in branding position against the glove; and Fig. 7 is a perspective view of a heating element for the branding iron showing two of the branding irons in position.

In the drawings, like parts have been designated throughout by like reference characters.

Briefly the invention comprises a platform or mandrel which provides a support over which the article to be marked may be placed; and a guide means hingedly carried by the mandrel having means to guide and limit the positions of the branding irons into connection with the glove.

More particularly the device comprises a flat rectangular base 1, provided with a vertically and transversely extending upright 2 spaced from one end of the base 1, which support has secured thereto by screws 3 a platform 4 which extends in a plane parallel to the base 1. The free end of the platform 4 may be rounded, as indicated at 5, to permit easier application of the article to be marked and prevent snagging of the article by sharp corners. Although the device shown and described is particularly adapted for marking rubber gloves, it will be obvious to those versed in the art that the same may be adapted to marking other articles with very slight changes. The materials of construction may be sheet steel or other rigid metal. The table or platform 4, as previously explained, comprises the support which provides a rigid backing for the rubber article and permits the same to be placed thereover and present a smooth surface to be marked.

The branding iron guiding mechanism is hingedly supported above the support 4 by a flat plate 6 which is secured against the support 2 by studs 8 which extend through slots 7 and are threaded into the support 2. This member thus may be adjusted vertically on the support 2 to vary the distance of the guiding mechanism above the platform 4.

A hinge comprising leaves 9 and 10 with a pintle 11 is secured to the outer face of the support 6 by screws 12 and has connected thereto the guide support 13 which is secured to the other leaf of the hinge by screws 14 which extend through a lever member 15 and the hinge into the body of the support 13. The support 13 is of generally rectangular formation, the end being curved at 5' symmetrical with the table 4. Spaced from the hinge and from the end at an intermediate part of the support, there is provided a transversely extending rectangular opening 17 through the guide support 13. Immediately below the opening there is provided a rectangular frame 18 secured to the underside of the support 13 by screws 19 and having a rectangular opening 20 therethrough, which frame comprises a presser-foot for engaging the rubber article and holding it against movement.

At the free end of the member 13 there is provided a pair of upstanding aligned oppositely spaced bosses 21 between which is hingedly connected by a pin 22, guide member 23 which extends away from the end of the support 13 toward the hinge. The end of the support 23 carries the branding iron guide 25 which comprises a rectangular frame having a plurality of spaced partitions 26. The guide is secured to the support 23 by screws 27 which extend through the support 23 and are threaded into an outwardly extending ledge 28 on the side of the frame underneath the support 23. The guide is adapted to extend downwardly when the support 23 is rotated about the pivot 22 into the opening 17. It is normally held out of the opening and above the surface of the support 13 by a helical spring 30, the upper end of which engages the underside of the support 23 and the lower end of which rests on the top of the support 13 being held in position by a guide post 31 set into the support 13.

Means for limiting the movement of the guide 25 in both upward and downward directions is provided and comprises a stud which extends through a slot 36 in the support 23 and is threaded into the support 13. A locknut 37 is provided at the base of the stud by which the stud may be locked in a predetermined position. A head 35 on the end of the stud engages the upper surfaces of the support 23 predetermining the distance that the guide may extend above the support 13. A pair of locknuts 38 are provided on the intermediate portion of the stud for engagement with the under surface of the support 23 to limit the downward travel of the guide 25 into the opening 17.

The branding iron, as best shown in Figs. 3 to 5 inclusive, comprises a tapered shank 40 of rectangular cross section having a branding face 41 on its extremity and provided at its upper end with a pair of laterally extending bosses 42. A rod 43 is secured into the iron and is provided with a wood handle 44 on its end. A heating device for heating the branding irons is provided and comprises an insulating case 50 which houses suitable heating coils, being provided with an electrical outlet connection 51 for attachment to a source of electric current. A heating member 52 is provided which has a plurality of spaced openings 53 for receiving the branding irons as best shown in Fig. 7.

In operation the heating device 50 is connected to a source of electric current whereby the member 52 is heated. A series of branding irons are placed in the openings 53, two of such irons being shown therein, where they are heated to a predetermined temperature. The temperature to which the irons are heated may be controlled thermostatically and is adapted to heat the irons to a sufficiently high temperature to enable the branding operation to be carried out. In practice, the platform or support 4 may be provided with a rubber sheath 60 stretched over the support below the point of application of heat and contact of the presser-foot 18. This padding is, however, not necessary, but does assist in preventing wear between the presser-foot and the support 4. The branding irons having been heated, the glove is slid over the end of the platform 4 so that the cuff is in the position shown in Fig. 6. During the process of placing the glove on the platform 4, the entire guide assembly comprising the support 13 and the parts attached thereto, may be rotated about the hinge 9—10 by the lever 15, to an upward position. The lever 15 is then released and the platform 13 with the presser-foot 18 lowered into contact with the glove. The branding iron is then inserted in one of the openings between the partitions 26, the bosses 42 on the irons extend laterally over the edge of the frame prevent the branding irons from slipping through the openings. The tapered side 45 of the iron, permits the iron to be readily inserted into the opening. The iron being in position, it is then pushed downward, bosses 42 engaging the sides of the guide and rotating the guide 25 and support 23 downwardly against the pressure of the spring 30, until the support 23 engages the stop-nuts 37. In this position, as best shown in Fig. 6, the indicia on the branding iron engages the surface of the glove. The branding iron being heated, the indicia is burned into the surface of the glove.

Inasmuch as the amount of pressure is regulated by the stop-nut 37, the iron 40 will only burn into the glove a very short distance and will cool off before it can burn far enough to damage the glove.

If it is desired to put serial numbers on the glove, each iron could be numbered consecutively from 0 to 9, and thus permit any series of numbers to be applied thereto consecutively by starting from the opening to the left or near side as viewed in Fig. 2, and putting each iron of the desired number in each consecutive opening. A small amount of experience will predetermine the time necessary to properly mark the glove. Although the mark appears to be superficial, it does not have a slight amount of effect on the texture of the glove at these points; the glove may thus be worn and cleaned a great number of times and the marking will always be apparent.

Although I have described the device as using the irons consecutively, it is also obvious that a number of the irons could be used simultaneously, or that a single iron with a brand mark could be used in place of the numbers.

Having thus described my invention and an embodiment thereof, I am aware that numerous and extensive departures may be made by those versed in the art without departing from the spirit and scope of the invention, and I do not desire to limit my invention from the specific embodiment shown, other than as expressed by the appended claims.

I claim:

1. A branding machine for branding rubber articles, a base, an upright on said base, a mandrel having a flat upper surface supported by said upright in a plane above said base and adapted to receive an article thereon, means to hold said article on the mandrel comprising a frame, a support for carrying said frame hingedly connected to said upright, said frame defining a rectangular opening therethrough, said support being formed to provide an opening therein above said frame, a branding iron guide pivotally connected to said support and having a branding iron holder disposed above the opening in said support and lowerable into said opening, stop means carried by said support and limiting the upward and downward travel of the guide relative to the support, spring means for holding the guide to its upper limits of movement, a branding iron having branding indicia on its lower end and having holder engaging lugs spaced from its end, said branding iron adapted to be inserted in said holder and said lugs adapted to engage said holder to move said guide downward with the iron when pressure is exerted on the iron, said guide guiding said iron on said lowering movement into contact with said article and said stop means limiting the depth to which the iron is embedded in the article to be marked.

2. A branding machine for branding rubber articles, a base, an upright on said base, a mandrel supported by said upright in a plane above said base and having a flat upper surface adapted to receive an article thereon, means to hold said article on said mandrel comprising a frame, a support for carrying said frame hingedly connected to said upright, and a lever connected to said support for raising and lowering the same over said mandrel and arranged to hold said support in a plane at substantially right angles to the mandrel when an article is being placed thereon, said frame formed to define a rectangular opening therethrough and said support formed to provide an opening above said frame, a branding iron guide pivotally connected to said support and having a branding iron holder disposed above the opening in said support and lowerable into said opening, stop means carried by said support and limiting the upward and downward travel of the guide relative to the support, spring means for holding the guide to its upper limits of movements, a branding iron having branding indicia on its lower end and having holder engaging lugs spaced from its end, said branding iron adapted to be inserted in said holder and said lugs adapted to engage said holder to move said guide downward with the iron when pressure is exerted on the iron, said guide guiding said iron on said lowering movement into contact with said article and said stop means limiting the depth to which the iron is embedded in the article to be marked.

3. In an apparatus for branding rubber articles or the like, comprising, an upright, a mandrel affixed thereon for holding the article to be branded, a support connected to said upright, a branding iron, guide means secured to said support for retaining said article immovably on said mandrel, said guide means receiving the branding iron and directing it towards the article and means for limiting the depth to which the branding iron is embedded in the article.

4. In an apparatus for branding rubber articles, a base, a support carried by said base and adapted to receive the article to be branded, a second support mounted on said base and disposed in spaced parallel relation with the first named support, means secured to the last named support for retaining the rubber article immovably on the first named support, a guide hingedly carried by said last named support, a branding iron insertable therein, said guide pivotally moving the branding iron into engagement with the rubber article.

5. An apparatus for marking a rubber article by branding, including a support for supporting the article in a flat plane, a presser member carried by said support for engaging and retaining said article immovably on the support, said presser member having an opening therein formed to frame an area in which the article is to be marked, a guide pivotally supported by said presser member and projecting over said opening therein, a branding iron mounted in said guide, said branding iron guided into contact with the article upon the pivotal movement of the guide, and means carried by said support for predetermining the amount of movement of the guide toward and away from the article.

6. In a branding apparatus embodying a base and a platform carried thereon and parallel thereto, a rubber article supported on the platform, a support having an opening therein pivotally secured to said base and adapted to be disposed in spaced parallel relation with the platform, a presser frame affixed to said support for engaging and retaining said article immovably on the platform, said presser frame provided with an opening in alignment with the opening in said support, a guide pivotally mounted on said support and projecting over the opening therein and means insertable in said guide to engage said rubber article.

EMERSON STERLING SMITH.